United States Patent
Jung et al.

(10) Patent No.: US 9,823,532 B2
(45) Date of Patent: Nov. 21, 2017

(54) LIQUID CRYSTAL DISPLAY

(71) Applicant: Samsung Display Co., Ltd., Yongin, Gyeonggi-do (KR)

(72) Inventors: Kwang-Chul Jung, Yongin (KR); Il Gon Kim, Yongin (KR); Jun Ki Jeong, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 362 days.

(21) Appl. No.: 14/617,680

(22) Filed: Feb. 9, 2015

(65) Prior Publication Data
US 2015/0227014 A1    Aug. 13, 2015

(30) Foreign Application Priority Data
Feb. 10, 2014  (KR) ........................ 10-2014-0015104

(51) Int. Cl.
| G02F 1/136 | (2006.01) |
| G02F 1/1343 | (2006.01) |
| G02F 1/1337 | (2006.01) |
| G02F 1/1362 | (2006.01) |
| G02F 1/1333 | (2006.01) |
| G02F 1/1368 | (2006.01) |

(52) U.S. Cl.
CPC ...... *G02F 1/136286* (2013.01); *G02F 1/1368* (2013.01); *G02F 1/13624* (2013.01); *G02F 1/133345* (2013.01); *G02F 1/136227* (2013.01); *G02F 1/134309* (2013.01); *G02F 2001/134345* (2013.01); *G02F 2001/134354* (2013.01)

(58) Field of Classification Search
CPC .................................................. G02F 1/13624
See application file for complete search history.

(56) References Cited

U.S. PATENT DOCUMENTS

| 6,335,778 B1 | 1/2002 | Kubota et al. |
| 6,894,670 B2 | 5/2005 | Funakoshi et al. |
| 7,212,183 B2 | 5/2007 | Tobita |

(Continued)

FOREIGN PATENT DOCUMENTS

| KR | 10-2002-0008601 | 1/2002 |
| KR | 10-2006-0062908 | 6/2006 |

(Continued)

OTHER PUBLICATIONS

European Search Report dated May 26, 2015 in corresponding European Application No. 15154090.3.

*Primary Examiner* — Wen-Ying P Chen
(74) *Attorney, Agent, or Firm* — Knobbe Martens Olson & Bear, LLP

(57) ABSTRACT

A liquid crystal display includes: a first substrate; a gate line disposed on the first substrate; a first data line and a second data line disposed on the first substrate; a first thin film transistor connected to the gate line and to the first data line; a first subpixel electrode connected to the first thin film transistor; a second thin film transistor connected to the gate line and to the second data line; a second subpixel electrode connected to the second thin film transistor; a third thin film transistor connected to the gate line and to the first data line; a fourth thin film transistor connected to the gate line and to the second data line; and a third subpixel electrode connected to the third and fourth thin film transistors.

23 Claims, 11 Drawing Sheets

(56) References Cited

U.S. PATENT DOCUMENTS

| | | |
|---|---|---|
| 7,636,076 B2 | 12/2009 | Hung et al. |
| 8,159,480 B2 | 4/2012 | Tajiri |
| 8,279,366 B2 | 10/2012 | Chen |
| 8,334,882 B2 | 12/2012 | Yoshida |
| 2008/0122772 A1 | 5/2008 | Takeuchi et al. |
| 2010/0123842 A1 | 5/2010 | Lee et al. |
| 2010/0134742 A1 | 6/2010 | Kim et al. |
| 2012/0154700 A1 | 6/2012 | Shin et al. |
| 2013/0002992 A1 | 1/2013 | Hirata et al. |
| 2013/0057818 A1* | 3/2013 | Cho ................. G02F 1/134363 349/141 |

FOREIGN PATENT DOCUMENTS

| | | |
|---|---|---|
| KR | 10-2006-0070177 | 6/2006 |
| KR | 10-2008-0045387 | 5/2008 |
| KR | 10-0997974 | 11/2010 |
| KR | 10-1182771 | 9/2012 |
| KR | 10-2014-0097905 | 8/2014 |

\* cited by examiner

LIQUID CRYSTAL DISPLAY

CROSS-REFERENCE TO RELATED APPLICATION

This application claims priority to, and the benefit of, Korean Patent Application No. 10-2014-0015104 filed in the Korean Intellectual Property Office on Feb. 10, 2014, the entire contents of which are incorporated herein by reference.

BACKGROUND

Field

The present disclosure relates to a liquid crystal display.

Description of the Related Technology

A liquid crystal display is currently one of the most widely used flat panel displays, and includes two display panels on which electric field generating electrodes, such as a pixel electrode and a common electrode, are formed, and a liquid crystal layer interposed between the two display panels.

The liquid crystal display displays an image by generating an electric field on a liquid crystal layer by applying a voltage to the field generating electrodes, determining alignment directions of liquid crystal molecules of the liquid crystal layer through the generated field, and controlling polarization of incident light.

The liquid crystal display typically includes a switching element connected to a pixel electrode and a plurality of signal lines, such as gate lines and data lines, for applying voltages to the pixel electrodes so as to control the switching elements.

Among the liquid crystal displays, a vertically aligned mode liquid crystal display, in which liquid crystal molecules are aligned so that long axes thereof are perpendicular to the upper and lower panels while no electric field is applied, has been in the limelight because its contrast ratio is high and a wide reference viewing angle is easily implemented.

For such a mode liquid crystal display, in order to make side visibility close to front visibility, a method has been proposed in which one pixel is divided into two subpixels of different transmittance by applying different voltages to the two subpixels.

However, when the side visibility becomes similar to the front visibility by dividing one pixel into two subpixels of different transmittance, luminance is increased at a low grayscale or a high grayscale, and thus gray expression at the side is difficult, thereby deteriorating picture quality.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present disclosure has been made in an effort to provide a liquid crystal display that is capable of accurately expressing a gray in a low grayscale region while making side visibility similar to front visibility.

A liquid crystal display according to an embodiment includes: a first substrate; a gate line disposed on the first substrate; a first data line and a second data line disposed on the first substrate; a first thin film transistor connected to the gate line and to the first data line; a first subpixel electrode connected to the first thin film transistor; a second thin film transistor connected to the gate line and to the second data line; a second subpixel electrode connected to the second thin film transistor; a third thin film transistor connected to the gate line and to the first data line; a fourth thin film transistor connected to the gate line and to the second data line; and a third subpixel electrode connected to the third and fourth thin film transistors.

The first thin film transistor and the second thin film transistor may be disposed between the first subpixel electrode and the second subpixel electrode, and the third thin film transistor and the fourth thin film transistor may be disposed between the second subpixel electrode and the third subpixel electrode.

The third subpixel electrode may be connected to drain electrodes of the third and fourth thin film transistors, and a ratio of a channel width of the third thin film transistor to a channel length thereof may be substantially equal to or different from the ratio of a channel width of the fourth thin film transistor to a channel length thereof.

A first area H corresponding to the first subpixel electrode, a second area L corresponding to the second subpixel electrode, and a third area M corresponding to the third subpixel electrode may satisfy the equation: H≤M<L.

The first data line may transmit a first data voltage, the second data line may transmit a second data voltage, the first and second data voltages may be obtained from one image signal and may be different from each other, and the third subpixel electrode may be applied with a third voltage between the first and second data voltages.

The gate line may include a first gate line and a second gate line that are connected to each other, the first and second thin film transistors may be connected to the first gate line, and the third and fourth thin film transistors may be connected to the second gate line.

The liquid crystal display may further include an insulating layer disposed on the gate line, the first data line, and the second data line, a first portion of the first subpixel electrode may overlap a first portion of the second subpixel electrode while interposing the insulating layer therebetween, and a first portion of the third subpixel electrode may overlap a second portion of the second subpixel electrode while interposing the insulating layer therebetween.

The first thin film transistor, the second thin film transistor, the third thin film transistor, and the fourth thin film transistor may be disposed between the first subpixel electrode and the third subpixel electrode, and the first thin film transistor, the second thin film transistor, the third thin film transistor, and the fourth thin film transistor may be disposed between the first portion of the second subpixel electrode and the second portion of the second subpixel electrode.

One pixel area of the liquid crystal display may include a first pixel area and a second pixel area, the first portion of the first subpixel electrode, the first portion of the second subpixel electrode, and the second portion of the first subpixel electrode may be disposed in the first pixel area, and the first portion of the third subpixel electrode, the second portion of the second subpixel electrode, the second portion of the third subpixel electrode may be disposed in the second pixel area, and a size of the first pixel area may be substantially equal to or greater than a size of the second pixel area.

The first portion of the first subpixel electrode may be disposed under the insulating layer, the second portion of the first subpixel electrode may be disposed on the insulating layer, and the first and second portions of the first subpixel electrode may be connected to each other through a contact hole that is formed in the insulating layer.

The first portion of the third subpixel electrode may be disposed under the insulating layer, the second portion of the third subpixel electrode may be disposed on the insulating layer, and the first and second portions of the third subpixel may be connected to each other through a contact hole that is formed in the insulating layer.

The first portion of the second subpixel electrode may be disposed on the insulating layer and may have a plurality of minute branch portions, and the first portion of the first subpixel electrode may be disposed under the insulating layer and may have a planar shape. The second portion of the second subpixel electrode may be disposed on the insulating layer and may have a plurality of minute branch portions, and the first portion of the third subpixel electrode may be disposed under the insulating layer and may have a planar shape.

The liquid crystal display according to embodiments is capable of accurately expressing a gray in a low grayscale region while making side visibility similar to front visibility.

DETAILED DESCRIPTION OF CERTAIN INVENTIVE EMBODIMENTS

Figure 1:
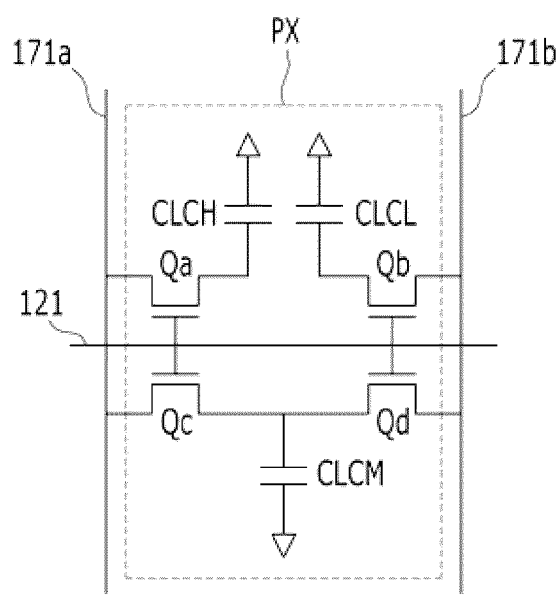
FIG. 1 is an equivalent circuit diagram of a pixel of a liquid crystal display according to an embodiment.

Embodiments will be described more fully hereinafter with reference to the accompanying drawings, in which certain embodiments are shown.

As those skilled in the art would realize, the described embodiments may be modified in various ways, without departing from the spirit or scope of the present invention.

On the contrary, embodiments introduced herein are provided to make disclosed contents thorough and complete, and to sufficiently transfer the spirit of the present invention to those skilled in the art.

In the drawings, the thickness of layers and regions may be exaggerated for clarity.

It will be understood that when a layer is referred to as being "on" another layer or substrate, it can be directly on the other layer or substrate, or intervening elements may also be present.

Like reference numerals generally designate like elements throughout the specification.

A pixel of a liquid crystal display according to an embodiment is described with reference to FIG. 1.

FIG. 1 is an equivalent circuit diagram of a pixel of the liquid crystal display according to an embodiment.

Referring to FIG. 1, the liquid crystal display according to an embodiment includes signal lines including a gate line 121, a first data line 171a, and a second data line 171b, and a pixel PX connected thereto.

The pixel PX includes a first switching element Qa, a second switching element Qb, a third switching element Qc, a fourth switching element Qd, a first liquid crystal capacitor CLCH, a second liquid crystal capacitor CLCL, and a third liquid crystal capacitor CLCM.

The first switching element Qa, the second switching element Qb, the third switching element Qc, and the fourth switching element Qd are connected to the same gate line 121, the first and third switching elements Qa and Qc are connected to the first data line 171a, and the second and fourth switching elements Qb and Qd are connected to the second data line 171b.

The first switching element Qa, the second switching element Qb, the third switching element Qc, and the fourth switching element Qd are three terminal elements, such as for example thin film transistors, that are disposed on a substrate of the liquid crystal display.

A control terminal of the first switching element Qa is connected to the gate line 121, an input terminal thereof is connected to the first data line 171a, and an output terminal thereof is connected to the first liquid crystal capacitor CLCH.

A control terminal of the second switching element Qb is connected to the gate line 121, an input terminal thereof is connected to the second data line 171b, and an output terminal thereof is connected to the second liquid crystal capacitor CLCL.

A control terminal of the third switching element Qc is connected to the gate line 121, an input terminal thereof is connected to the first data line 171a, and an output terminal thereof is connected to the third liquid crystal capacitor CLCM, while a control terminal of the fourth switching element Qd is connected to the gate line 121, an input terminal thereof is connected to the second data line 171b, and an output terminal thereof is connected to the third liquid crystal capacitor CLCM.

A first subpixel electrode 191a (see FIG. 2) connected to the first switching element Qa and a common electrode 270 (see FIG. 3) overlap each other to form the first liquid crystal capacitor CLCH.

A second subpixel electrode 191b (see FIG. 2) connected to the second switching element Qb and the common electrode 270 overlap each other to form the second liquid crystal capacitor CLCL.

A third subpixel electrode 191c (see FIG. 2) connected to the third and fourth switching elements Qc and Qd and the common electrode 270 overlap each other to form the third liquid crystal capacitor CLCM.

The liquid crystal display illustrated in FIG. 1 will now be described in detail with reference to FIGS. 2 to 5.

Figure 2:
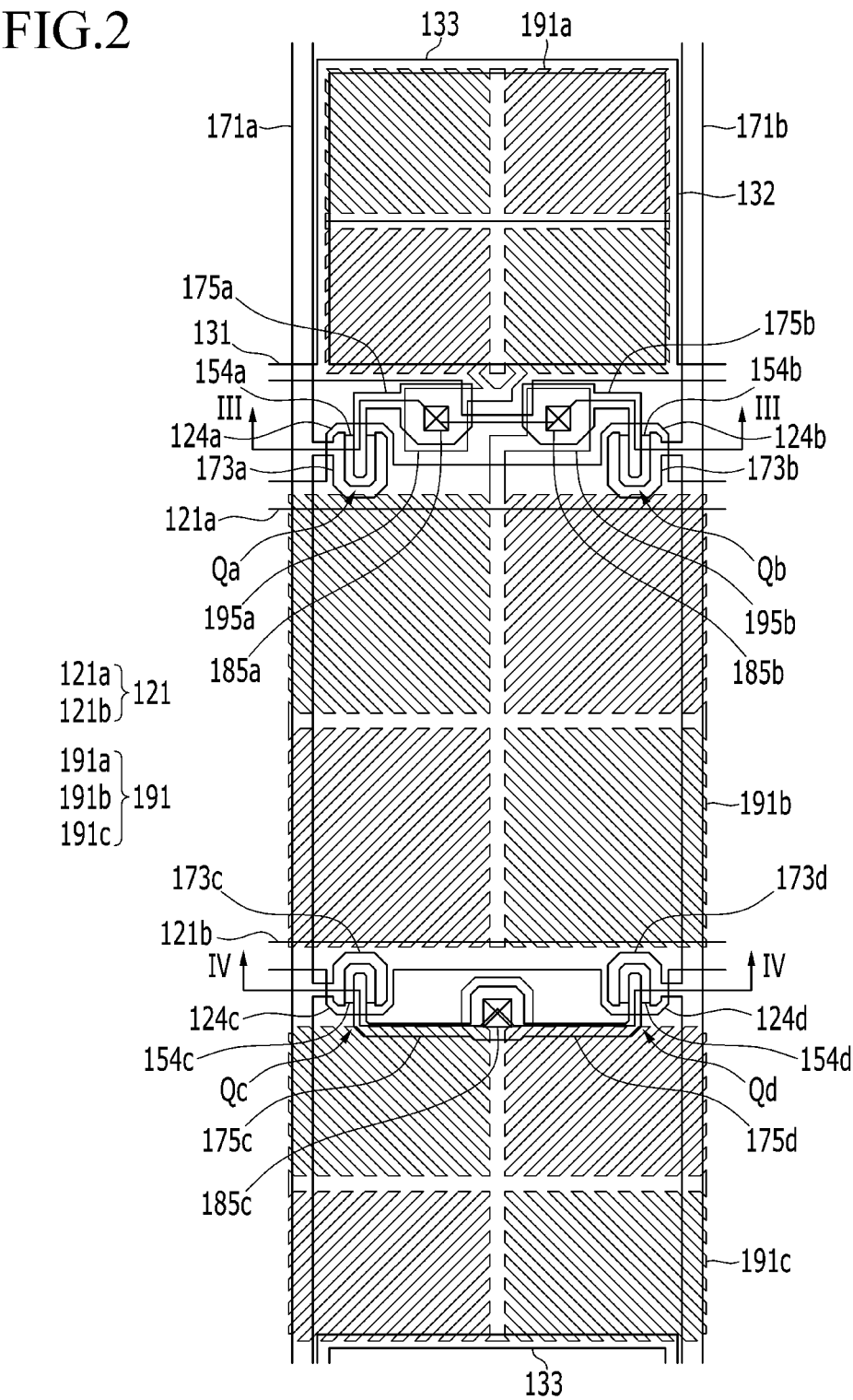
FIG. 2 is a layout view of the liquid crystal display according to an embodiment.
Figure 3:
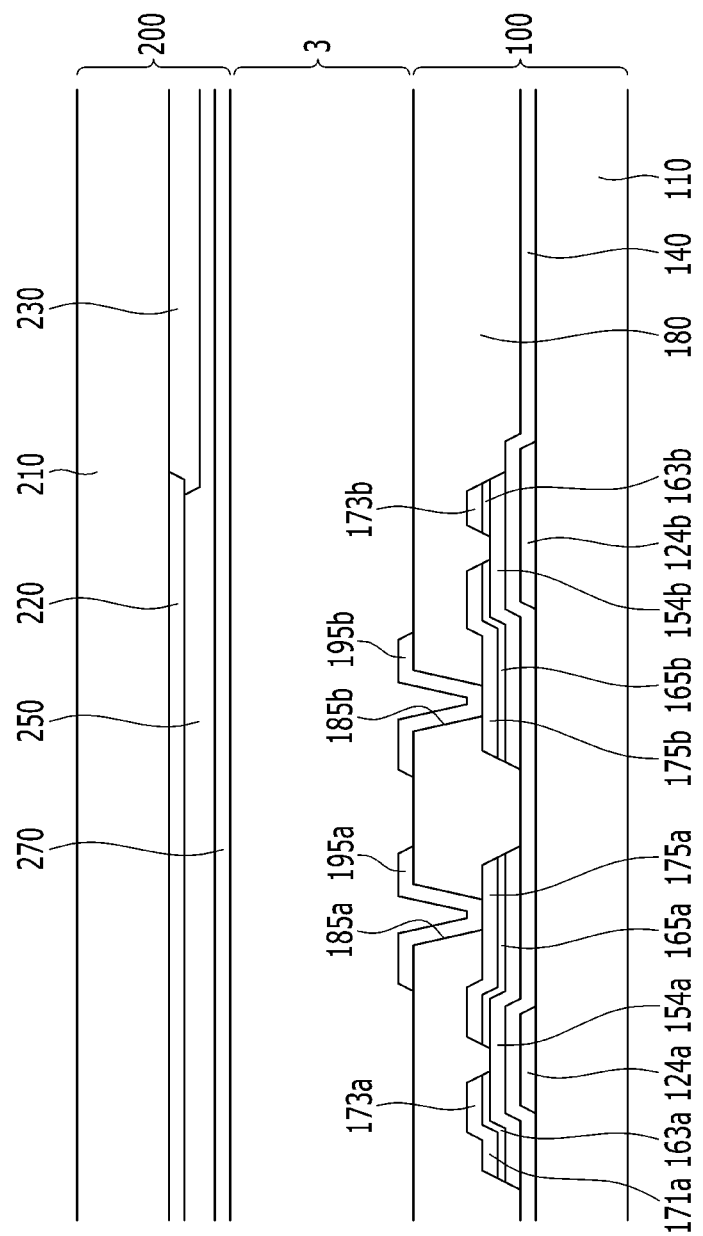
FIG. 3 is a cross-sectional view of the liquid crystal display of FIG. 2 taken along the line
Figure 4:
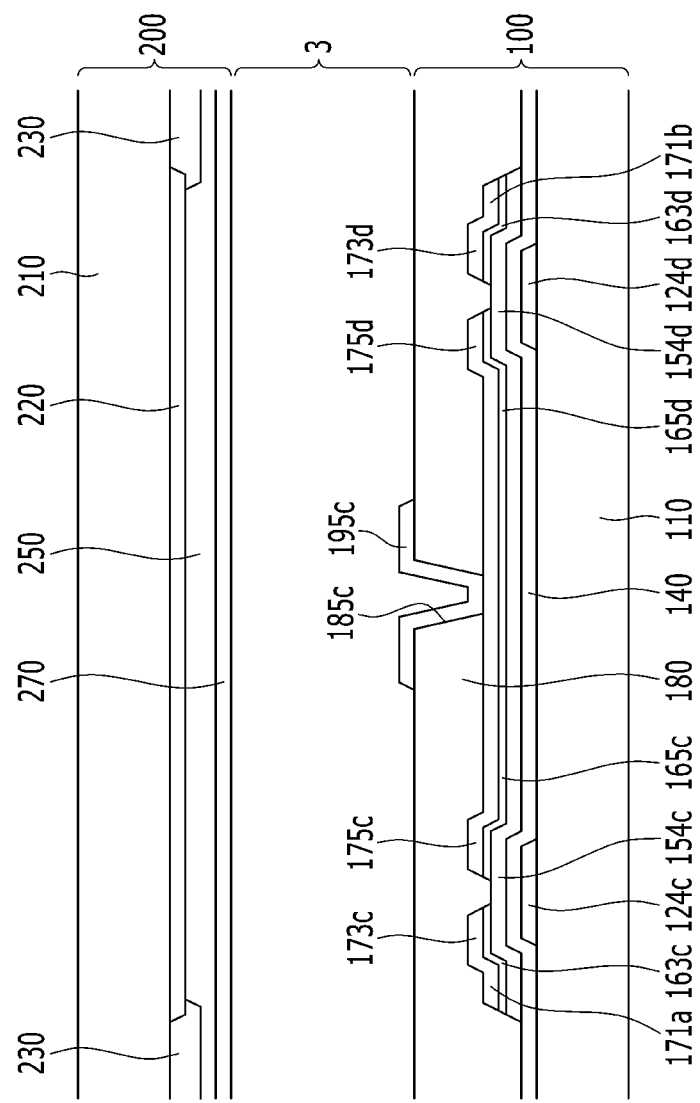
FIG. 4 is a cross-sectional view of the liquid crystal display of FIG. 2 taken along the line IV-IV.
Figure 5:
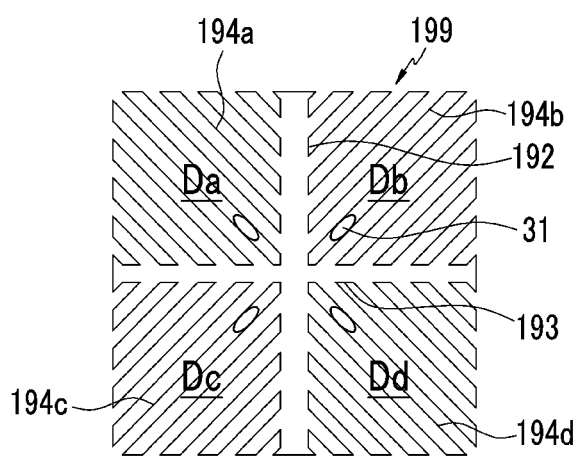
FIG. 5 is a layout view of a basic electrode of the liquid crystal display according to an embodiment.

FIG. 2 is a layout view of the liquid crystal display according to an embodiment, FIG. 3 is a cross-sectional view of the liquid crystal display of FIG. 2 taken along the line FIG. 4 is a cross-sectional view of the liquid crystal display of FIG. 2 taken along the line IV-IV, and FIG. 5 is a layout view of a basic electrode of the liquid crystal display according to an embodiment.

Referring to FIGS. 2 to 4, the liquid crystal display according to an embodiment includes a lower display panel 100 and an upper display panel 200 that face each other, and a liquid crystal layer 3 interposed between the two display panels 100 and 200.

The lower panel will be described first.

The gate line 121 and a storage voltage line 131 are disposed on a first insulation substrate 110. The gate line 121 includes a first gate line 121a and a second gate line 121b.

The first and second gate lines 121a and 121b are connected to each other, and may be applied with the same gate signal.

The first and second gate lines 121a and 121b mainly extend in a horizontal direction to transmit a gate signal.

The first gate line 121a includes a first gate electrode 124a and a second gate electrode 124b that mainly protrude upwards, and the second gate line 121b includes a third gate electrode 124c and a fourth gate electrode 124d that mainly protrude downwards.

The storage voltage line 131 includes storage electrodes 132 and 133.

A gate insulating layer 140 is disposed on the gate line 121 including the first and second gate lines 121a and 121b, and on the storage voltage line 131.

A first semiconductor 154a, a second semiconductor 154b, a third semiconductor 154c, and a fourth semiconductor 154d are disposed on the gate insulating layer 140.

The first semiconductor 154a, the second semiconductor 154b, the third semiconductor 154c, and the fourth semiconductor 154d may contain, for example, amorphous silicon, crystalline silicon, or an oxide semiconductor.

Ohmic contacts 163a, 165a, 163b, 165b, 163c, 165c, 163d, and 165d are respectively disposed on the first semiconductor 154a, the second semiconductor 154b, the third semiconductor 154c, and the fourth semiconductor 154d.

In embodiments where the first semiconductor 154a, the second semiconductor 154b, the third semiconductor 154c, and the fourth semiconductor 154d are made of an oxide semiconductor, the ohmic contacts may be omitted.

The first data line 171a, the second data line 171b, a first drain electrode 175a, a second drain electrode 175b, a third drain electrode 175c, and a fourth drain electrode 175d are respectively disposed on the ohmic contacts 163a, 165a, 163b, 165b, 163c, 165c, 163d, and 165d.

The first and second data lines 171a and 171b transmit a data signal, and mainly extend in a vertical direction to cross the first and second gate lines 121a and 121b.

The first data line 171a includes a first source electrode 173a that extends toward the first gate electrode 124a, and a third source electrode 173c that extends toward the third gate electrode 124c. The second data line 171b includes a second source electrode 173b that extends toward the second gate electrode 124b, and a fourth source electrode 173d that extends toward the fourth gate electrode 124d.

One end portion of the first drain electrode 175a is partially enclosed by the first source electrode 173a, one end portion of the second drain electrode 175b is partially enclosed by the second source electrode 173b, one end portion of the third drain electrode 175c is partially enclosed by the third source electrode 173c, and one end portion of the fourth drain electrode 175d is partially enclosed by the fourth source electrode 173d.

The third and fourth drain electrodes 175c and 175d are connected to each other.

The first, second, third, and fourth gate electrodes 124a, 124b, 124c, and 124d, the first, second, third, and fourth source electrodes 173a, 173b, 173c, and 173d, and the first, second, third, and fourth drain electrodes 175a, 175b, 175c, and 175d respectively form the first, second, third, and fourth thin film transistors (TFTs) 154a, 154b, 154c, and 154d, which are the first, second, third, and fourth switching elements Qa, Qb, Qc, and Qd, together with the first, second, third, and fourth semiconductors 154a, 154b, 154c, and 154d. Channels of the thin film transistors are respectively formed in the first, second, third, and fourth semiconductors 154a, 154b, 154c, and 154d between the first, second, third, and fourth source electrodes 173a, 173b, 173c, and 173d and the first, second, third, and fourth drain electrodes 175a, 175b, 175c, and 175d.

Except for the channel regions, the semiconductors 154a, 154b, 154c, and 154d have substantially the same planar shape as the data lines 171a and 171b, the source electrodes 173a, 173b, 173c, and 173d, the drain electrodes 175a, 175b, 175c, and 175d, and the ohmic contacts 163a, 165a, 163b, 165b, 163c, 165c, 163d, and 165d.

A passivation layer 180 is disposed on exposed portions of the data lines 171a and 171b, the drain electrodes 175a, 175b, 175c, and 175d, and the semiconductors 154a, 154b, 154c, and 154d.

A first contact hole 185a, a second contact hole 185b, and a third contact hole 185c respectively exposing a wide end portion of the first drain electrode 175a, a wide end portion of the second drain electrode 175b, and a wide connection portion that connects the third and fourth drain electrodes 175c and 175d are formed in the passivation layer 180.

A pixel electrode 191 including the first subpixel electrode 191a, the second subpixel electrode 191b, and the third subpixel electrode 191c is disposed on the passivation layer 180. The first thin film transistor Qa and the second thin film transistor Qb are disposed between the first subpixel electrode 191a and the second subpixel electrode 191b, and the third thin film transistor Qc and the fourth thin film transistor Qd are disposed between the second subpixel electrode 191b and the third subpixel electrode 191c.

When an area formed with the first subpixel electrode 191a, an area formed with the second subpixel electrode 191b, and an area formed with the third subpixel electrode are respectively represented as a first area H, a second area L, and a third area M, sizes of the first area H, the second area L, and the third area M can be expressed as follows:

$$H \leq M < L$$

The first subpixel electrode 191a, the second subpixel electrode 191b, and the third subpixel electrode 191c respectively include one or more of a basic electrode 199 illustrated in FIG. 5 or a variant thereof.

The basic electrode 199 will now be described in detail with reference to FIG. 5.

As shown in FIG. 5, the basic electrode 199 has a generally quadrangular shape, and includes a cross-shaped stem portion including a horizontal stem portion 193 and a vertical stem portion 192 that is perpendicular thereto.

Further, the basic electrode 199 is divided into a first subregion Da, a second subregion Db, a third subregion Dc, and a fourth subregion Dd by the horizontal and vertical stem portions 193 and 192, and each of the subregions Da to Dd includes a plurality of first to fourth minute branch portions 194a, 194b, 194c, and 194d.

The first minute branch portion 194a obliquely extends in an upper left direction from the horizontal stem portion 193 or vertical stem portion 192, while the second minute branch portion 194b obliquely extends in an upper right direction from the horizontal stem portion 193 or vertical stem portion 192.

In addition, the third minute branch portion 194c obliquely extends in a lower left direction from the horizontal stem portion 193 or vertical stem portion 192, while the fourth minute branch portion 194d obliquely extends in a lower right direction from the horizontal stem portion 193 or vertical stem portion 192.

The first to fourth minute branch portions 194a, 194b, 194c, and 194d form an angle of about 45 or 135 degrees with respect to the gate lines 121a and 121b or the horizontal stem portion 193.

Further, the minute branch portions 194a, 194b, 194c, and 194d of two adjacent subregions Da, Db, Dc, and Db may be perpendicular to each other.

The first subpixel electrode 191a includes a first extended portion 195a, the first extended portion 195a is disposed in the first contact hole 185a, and the first subpixel electrode 191a is applied with a first data voltage from the first drain electrode 175a through the first contact hole 185a.

Similarly, the second subpixel electrode 191b includes a second extended portion 195b, the second extended portion 195b is disposed in the second contact hole 185b, and the second subpixel electrode 191b is applied with a second data voltage from the second drain electrode 175b through the second contact hole 185b.

The first and second data voltages are obtained from one image signal, and respectively have different values.

The first data voltage may be greater than the second data voltage.

The third subpixel electrode 191c is applied with a third data voltage between the first and second data voltages from the third and fourth drain electrodes 175c and 175d through the third contact hole 185c.

As described above, the third and fourth drain electrodes 175c and 175d are connected to each other, and the third subpixel electrode 191c is applied with the third data voltage between the first and second data voltages from the third and fourth drain electrodes 175c and 175d through the third contact hole 185c.

If a first channel width CWA and a first channel length CLA of the third thin film transistor Qc connected to the first data line 171a are equal to a second channel width CWB and a second channel length CLB of the fourth thin film transistor Qd connected to the second data line 171b, the third subpixel electrode 191c is applied with the third data voltage having an intermediate value between the first data voltage transmitted through the first data line 171a and the second data voltage transmitted through the second data line 17 lb.

However, if a first ratio (CWA/CLA) of the first channel width CWA of the third thin film transistor Qc to the first channel length CLA thereof is greater than a ratio (CWB/CLB) of the second channel width CWB of the fourth thin film transistor Qd to the second channel length CLB thereof, influence of the first data voltage transmitted through the third thin film transistor Qc is increased such that the third subpixel electrode 191c is applied with the third data voltage that has the intermediate value between the first data voltage transmitted through the first data line 171a and the second data voltage transmitted through the second data line 171b but is closer to the first data voltage than the second data voltage.

In more detail, if the third and fourth thin film transistors Qc and Qd are respectively seen as a first resistance and a second resistance, an amount of current $I_A$ flowing through the third transistor Qc (first resistance) is proportional to the first channel width CWA of the third thin film transistor Qc, and is inversely proportional to the first channel length CLA thereof.

$$I_A \propto \frac{CW_A}{CL_A}$$

Similarly, an amount of current $I_B$ flowing through the fourth transistor Qd (second resistance) is proportional to the second channel width CWB of the fourth thin film transistor Qd, and is inversely proportional to the second channel length CLB thereof.

$$I_B \propto \frac{CW_B}{Cl_B}$$

Accordingly, if the ratio (CWA/CLA) of the first channel width CWA of the third thin film transistor Qc to the first channel length CLA thereof is greater than the ratio (CWB/CLB) of the second channel width CWB of the fourth thin film transistor Qd to the second channel length CLB thereof, the amount of current transmitted through the third thin film transistor Qc is increased such that the third subpixel electrode 191c is applied with the third data voltage that has the intermediate value between the first data voltage transmitted through the first data line 171a and the second data voltage transmitted through the second data line 171b but is closer to the first data voltage than the second data voltage.

On the contrary, if the ratio (CWA/CLA) of the first channel width CWA of the third thin film transistor Qc to the first channel length CLA thereof is smaller than the ratio (CWB/CLB) of the second channel width CWB of the fourth thin film transistor Qd to the second channel length CLB thereof, influence of the second data voltage is increased such that the third subpixel electrode 191c is applied with the third data voltage that has an intermediate value between the first data voltage transmitted through the first data line 171a and the second data voltage transmitted through the second data line 171b but is closer to the second data voltage than the first data voltage.

Accordingly, the third data voltage applied to the third subpixel electrode 191c can be controlled by varying the ratio (CW/CL) of the channel widths CW to the channel lengths CL of the third and fourth thin film transistors Qc and Qd.

In the liquid crystal display according to an embodiment, the ratio (CW/CL) of the channel width CW of the third thin film transistor Qc to the channel length CL thereof is substantially equal to or different from the ratio (CW/CL) of the channel width CW of the third thin film transistor Qd to the channel length CL thereof CL.

The first subpixel electrode 191a, the second subpixel electrode 191b, and the third subpixel electrode 191c that are applied with the data voltages generate an electric field together with the common electrode 270 of the upper display panel 200 so as to determine a direction of the liquid crystal molecules of the liquid crystal layer 3 between the two electrodes 191 and 270.

As described above, luminance of light passing through the liquid crystal layer 3 is varied depending on the direction of the liquid crystal molecules.

Sides of the first to fourth minute branch portions 194a, 194b, 194c, and 194d distort the electric field to make horizontal components that determine tilt directions of liquid crystal molecules 31.

The horizontal components of the electric field are substantially parallel to the sides of the first to fourth minute branch portions 194a, 194b, 194c, and 194d.

Thus, as shown in FIG. 5, the liquid crystal molecules 31 are inclined in a direction parallel to a longitudinal direction of the minute branch portions 194a, 194b, 194c, and 194d.

Since one basic electrode 199 includes the four subregions Da to Dd in which longitudinal directions of the minute branch portions 194a, 194b, 194c, and 194d are different from each other, the liquid crystal molecules 31 are inclined in four different directions to form four domains having different alignment directions of the liquid crystal molecules 31 in the liquid crystal layer 3.

As such, if the liquid crystal molecules are variously inclined, a reference viewing angle of the liquid crystal display becomes wider.

Returning to FIGS. 3 and 4, the upper panel 200 will now be described.

A light block 220 is disposed on a second insulation substrate 210.

The light block may be a black matrix, and prevents light leakage.

A color filter 230 is disposed on the second insulation substrate 210 and the light block 220.

The color filter 230 may be elongated in a vertical direction along the adjacent data lines 171a and 171b.

Each color filter 230 may display one of primary colors such as, for example, red, green, and blue.

However, the light block 220 and the color filter 230 may be disposed on the lower display panel 100 rather than the upper panel 200.

An overcoat 250 is disposed on the light block 220 and the color filter 230.

The overcoat 250 prevents the color filter 230 and the light block 220 from being lifted, and suppresses contamination of the liquid crystal layer 3 by an organic material such as a solvent flowing from the color filter 230, thereby preventing defects such as an afterimage generated when a screen is driven.

The common electrode 270 is disposed on the overcoat 250.

Alignment layers (not shown) are formed at inner sides of the display panels 100 and 200, and may be vertical alignment layers.

Polarizers (not shown) are provided at outer sides of the two display panels 100 and 200, transmissive axes of the two polarizers are perpendicular to each other, and one of the transmissive axes thereof may be parallel to the gate line 121.

However, the polarizer may be disposed at an outer side of one of the two display panels 100 and 200.

The liquid crystal layer 3 has negative dielectric anisotropy, and the liquid crystal molecules 31 of the liquid crystal layer 3 are aligned such that their long axes are perpendicular with respect to the surfaces of the two display panels 100 and 200 when no electric field is applied.

Thus, the incident light does not pass through the crossed polarizers but is blocked when no electric field is applied.

At least one of the liquid crystal layer 3 and the alignment layer may include a photo-reactive material, such as, for example, a reactive mesogen.

The liquid crystal display according to an embodiment includes the first subpixel electrode 191a that is applied with the first data voltage, the second subpixel electrode 191b that is applied with the second data voltage, and the third subpixel electrode 191c that is applied with the third data voltage between the first and second data voltages.

As described above, the first and second data voltages are obtained from one image signal, and respectively have different values.

In addition, the first data voltage may be greater than the second data voltage.

Accordingly, the electric field applied to the liquid crystal layer corresponding to the first subpixel electrode 191a is the greatest while the electric field applied to the liquid crystal layer corresponding to the second subpixel electrode 191b is smallest, and the electric field applied to the liquid crystal layer corresponding to the third subpixel electrode 191c is smaller than the electric field applied to the liquid crystal layer corresponding to the first subpixel electrode 191a and greater than the electric field applied to the liquid crystal layer corresponding to the second subpixel electrode 19 lb.

As described above, the display device according to an embodiment divides one pixel area into a region where the first subpixel electrode 191a to which the relatively high first data voltage is applied is disposed, a region where the second subpixel electrode 191b to which the relatively low data voltage is applied is disposed, and a region where the third subpixel electrode 191c to which the third data voltage between the first and second data voltages is applied is disposed Accordingly, the electric fields applied to the liquid crystal molecules corresponding to the first subpixel electrode, the second subpixel electrode, and the third subpixel electrode become different and thus inclined angles of the liquid crystal molecules become different. As a result, each region has a different luminance.

As such, when one pixel area is divided into three regions of different luminance, the transmittance is prevented from being abruptly changed at the side even at a low grayscale or a high grayscale by smoothly controlling the transmittance according to grayscale, such that the side visibility can be similar to the front visibility and the accurate gray expression is possible even at the low grayscale or the high grayscale.

In addition, as described above, the third data voltage applied to the third subpixel electrode has the intermediate value between the first data voltage applied to the first subpixel electrode and the second data voltage applied to the second subpixel electrode, and the third data voltage applied to the third subpixel electrode can be adjusted by controlling the ratio (CW/CL) of the channel width CW to the channel length CL of the third thin film transistor connected to the first data line for transmitting the first data voltage and the ratio (CW/CL) of the channel width CW to the channel length CL of the fourth thin film transistor connected to the second data line for transmitting the second data voltage.

An experimental example of will now be described with reference to FIG. 6.

Figure 6:
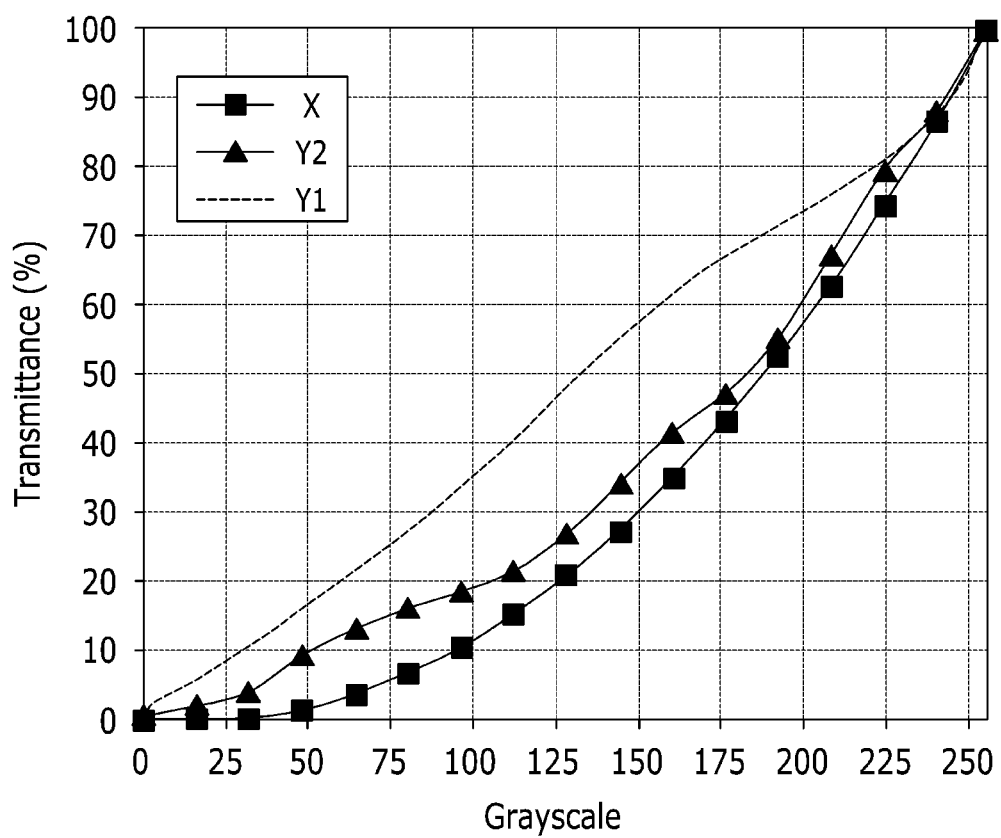
FIG. 6 is a graph showing transmittance of the liquid crystal display according to grayscale in an experimental example.

FIG. 6 is a graph showing transmittance of the liquid crystal display according to grayscale in the experimental example.

In the experimental example, the transmittance X of the liquid crystal display according to grayscale when viewed from a front side thereof and the transmittances Y1 and Y2 according to grayscale when viewed from a lateral side thereof are compared with respect to a first case and a second case. The first case is a conventional liquid crystal display in which one pixel area is divided into a region where the first subpixel electrode to which the relatively high first data voltage is applied is disposed, and a region where the second subpixel electrode to which the relatively low data voltage is applied is disposed. The second case is an embodiment in which one pixel area is divided into a region where the first subpixel electrode to which the relatively high first data voltage is applied is disposed, a region where the second subpixel electrode to which the relatively low data voltage is applied is disposed, and a region where the third subpixel electrode to which the third data voltage between the first and second data voltages is applied is disposed.

In FIG. 6, the transmittance of the first case according to grayscale when viewed from the lateral side thereof is represented as Y1, while the transmittance of the second case according to grayscale when viewed from the lateral side thereof is represented as Y2

Referring to FIG. 6, when compared with the transmittance Y1 of the first case according to grayscale when viewed from the lateral side thereof, it can be seen that the transmittance Y2 of the second case according to grayscale when viewed from the lateral side thereof is closer to the transmittance X of the liquid crystal display according to grayscale when viewed from the front side thereof.

Particularly, similar to the liquid crystal display according to an embodiment, it can be seen that the transmittance is slowly increased throughout the low grayscale and the high grayscale in the second case in which one pixel area is divided into the region where the first subpixel electrode to which the relatively high first data voltage is applied is disposed, the region where the second subpixel electrode to which the relatively low data voltage is applied is disposed, and the region where the third subpixel electrode to which the third data voltage between the first and second data voltages is applied is disposed. The second case is different from the first case in which the transmittance is abruptly increased in the low or middle grayscale or abruptly decreased in the high grayscale.

As described above, in the liquid crystal display according to an embodiment, it can be seen that the transmittance according to grayscale is slowly changed such that accurate gray expression is possible.

Accordingly, the liquid crystal display according to an embodiment may prevent picture quality deterioration that may occur when the gray expression becomes difficult.

A liquid crystal display according to another embodiment will now be described with reference to FIGS. 7 to 10.

Figure 7:
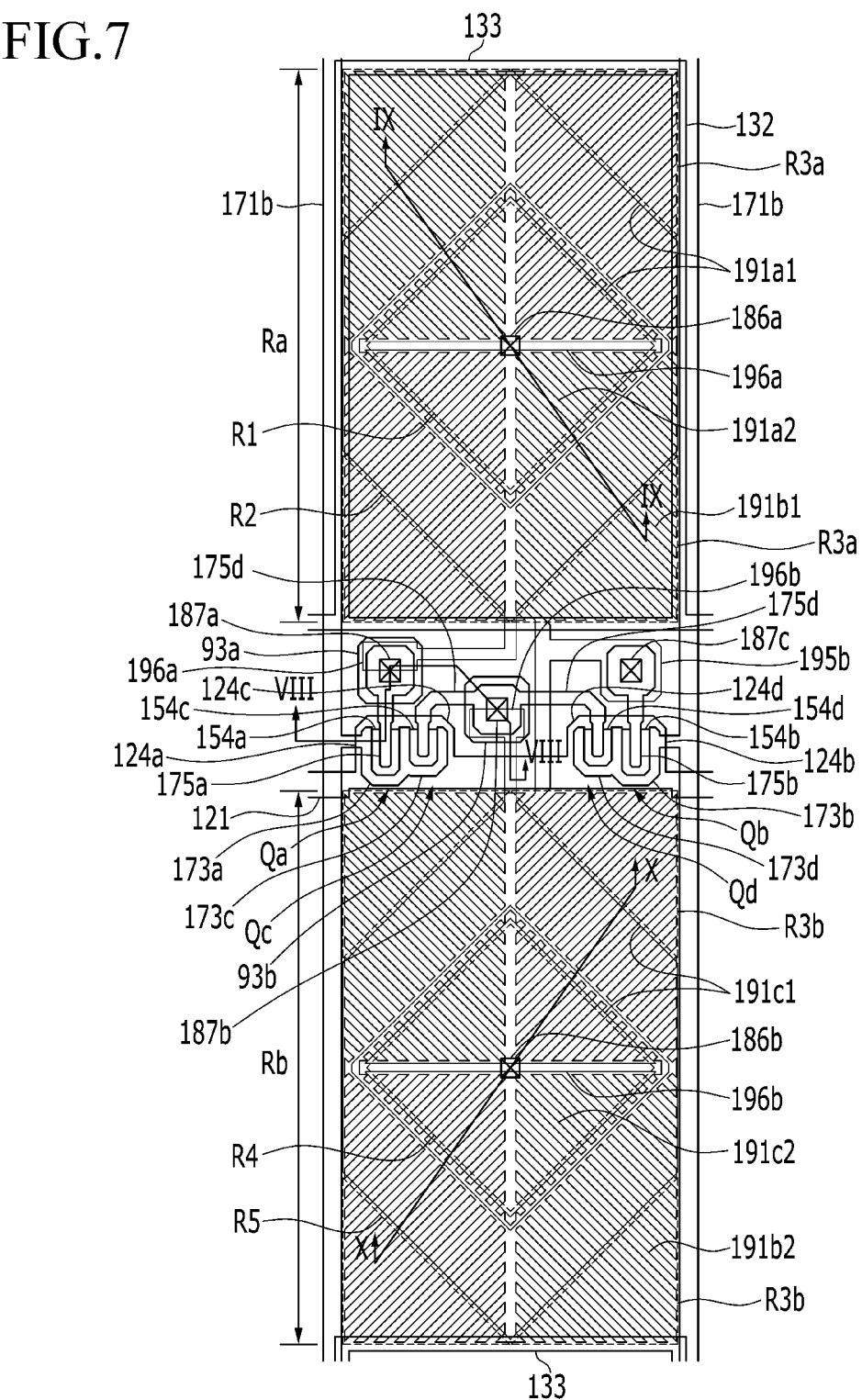
FIG. 7 is a layout view of the liquid crystal display according to an embodiment.
Figure 8:
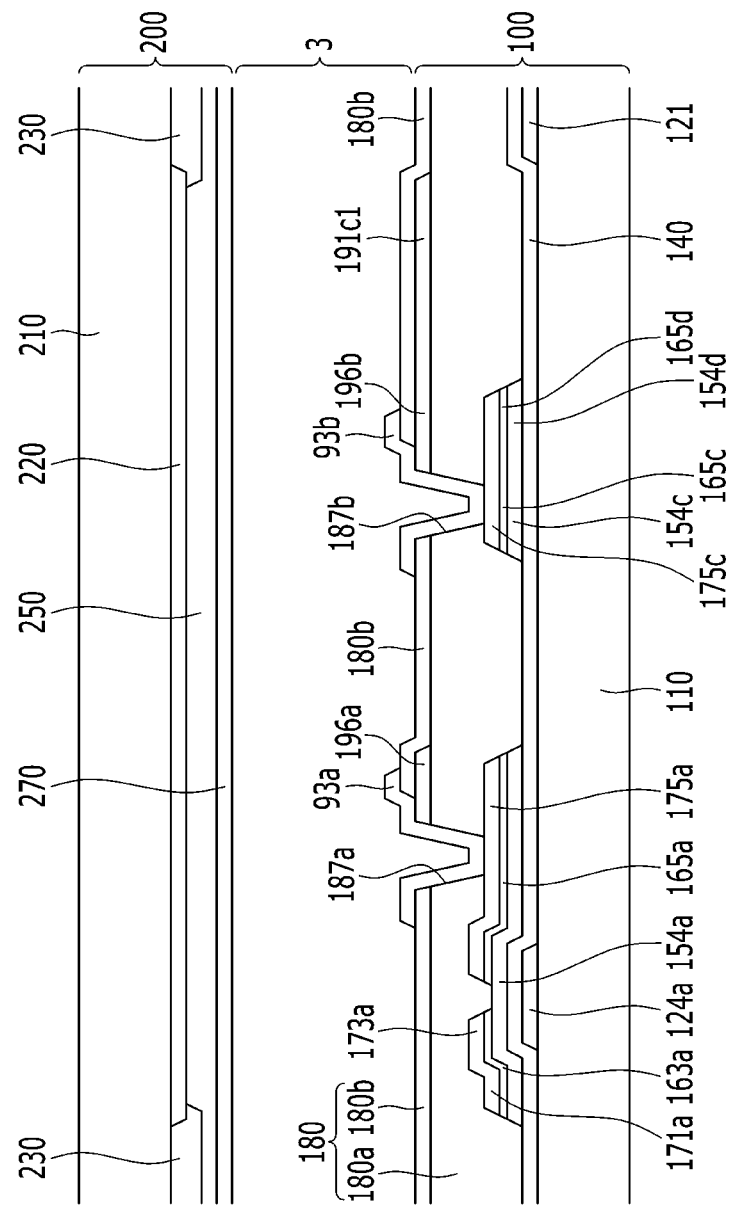
FIG. 8 is a cross-sectional view of the liquid crystal display of FIG. 7 taken along the line VIII-VIII.
Figure 9:
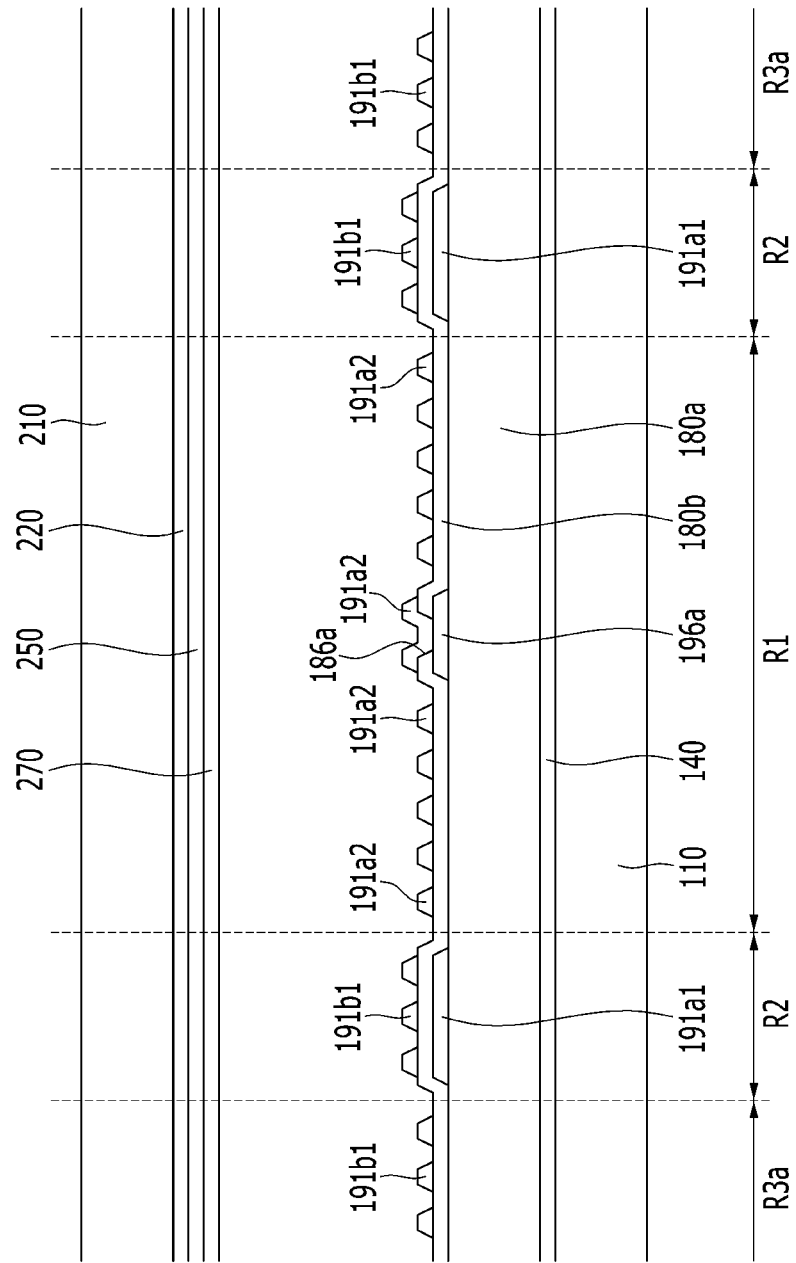
FIG. 9 is a cross-sectional view of the liquid crystal display of FIG. 7 taken along the line IX-IX.
Figure 10:
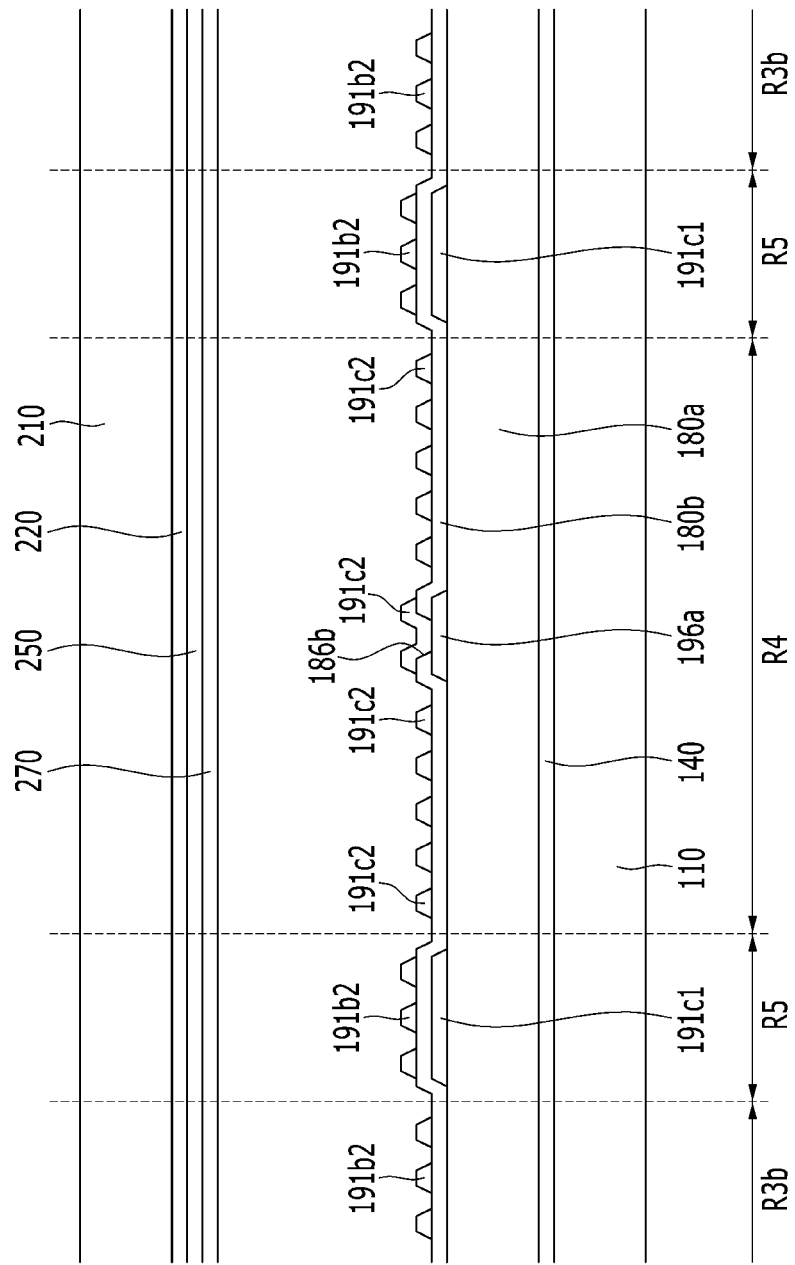
FIG. 10 is a cross-sectional view of the liquid crystal display of FIG. 7 taken along the line X-X.

FIG. 7 is a layout view of the liquid crystal display according to an embodiment, FIG. 8 is a cross-sectional view of the liquid crystal display of FIG. 7 taken along the line VIII-VIII, FIG. 9 is a cross-sectional view of the liquid crystal display of FIG. 7 taken along the line IX-IX, and FIG. 10 is a cross-sectional view of the liquid crystal display of FIG. 7 taken along the line X-X.

Referring to FIGS. 7 to 10, the liquid crystal display according to an embodiment includes a lower display panel 100 and an upper display panel 200 that face each other, and a liquid crystal layer 3 interposed between the two display panels 100 and 200.

The lower panel 100 will be described first.

A gate line 121 and a storage voltage line 131 are disposed on a first insulation substrate 110.

The gate line 121 includes a first gate electrode 124a, a second gate electrode 124b, a third gate electrode 124c, and a fourth gate electrode 124d.

The storage voltage line 131 includes storage electrodes 132 and 133.

A gate insulating layer 140 is disposed on the gate line 121 and the storage voltage line 131.

A first semiconductor 154a, a second semiconductor 154b, a third semiconductor 154c, and a fourth semiconductor 154d are disposed on the gate insulating layer 140.

The first semiconductor 154a, the second semiconductor 154b, the third semiconductor 154c, and the fourth semiconductor 154d may contain, for example, amorphous silicon, crystalline silicon, or an oxide semiconductor.

Ohmic contacts 163a and 165a are disposed on the first semiconductor 154a, the second semiconductor 154b, the third semiconductor 154c, and the fourth semiconductor 154d.

In embodiments where the first semiconductor 154a, the second semiconductor 154b, the third semiconductor 154c, and fourth semiconductor 154d include an oxide semiconductor, the ohmic contacts may be omitted.

A first data line 171a, a second data line 171b, a first drain electrode 175a, a second drain electrode 175b, a third drain electrode 175c, and a fourth drain electrode 175d are disposed on the ohmic contacts 163a and 165a.

The first and second data lines 171a and 171b transmit a data signal, and mainly extend in a vertical direction to cross the gate line 121.

The first data line 171a includes a first source electrode 173a that extends toward the first gate electrode 124a, and a third source electrode 173c that extends toward the third gate electrode 124c.

The first and third source electrodes 173a and 173c are connected to each other.

The second data line 171b includes a second source electrode 173b that extends toward the second gate electrode 124b, and a fourth source electrode 173d that extends toward the fourth gate electrode 124d.

The second and fourth source electrodes 173b and 173d are connected to each other.

One end portion of the first drain electrode 175a is partially enclosed by the first source electrode 173a, one end portion of the second drain electrode 175b is partially enclosed by the second source electrode 173b, one end portion of the third drain electrode 175c is partially enclosed by the third source electrode 173c, and one end portion of the fourth drain electrode 175d is partially enclosed by the fourth source electrode 173d.

The third and fourth drain electrodes 175c and 175d are connected to each other.

The first through fourth gate electrodes 124a, 124b, 124c, and 124d, the first through fourth source electrodes 173a, 173b, 173c, and 173d, and the first through fourth drain electrodes 175a, 175b, 175c, and 175d form the first through fourth thin film transistors (TFTs) 154a, 154b, 154c, and 154d, which are the first through fourth switching elements Qa, Qb, Qc, and Qd, together with the first through fourth semiconductors 154a, 154b, 154c, and 154d. Channels of the thin film transistors are respectively formed in the first through fourth semiconductors 154a, 154b, 154c, and 154d between the first through fourth source electrodes 173a, 173b, 173c, and 173d and the first through fourth drain electrodes 175a, 175b, 175c, and 175d.

Except for the channel regions, the semiconductors 154a, 154b, 154c, and 154d have substantially the same planar shape as the data lines 171a and 171b, the source electrodes 173a, 173b, 173c, and 173d, the drain electrodes 175a, 175b, 175c, and 175d, and the ohmic contacts 163a and 165a.

A first passivation layer 180a is disposed on exposed portions of the data lines 171a and 171b, the drain electrodes 175a, 175b, 175c, and 175d, and exposed portions of the semiconductors 154a, 154b, 154c, and 154d.

A first part 191a1 of a first subpixel electrode 191a and a first part 191c1 of a third subpixel electrode 191c are disposed on the first passivation layer 180a.

The first part 191a1 of the first subpixel electrode 191a and the first part 191c1 of the third subpixel electrode 191c are respectively disposed in a first pixel area Ra and a second pixel area Rb.

The first part 191a1 of the first subpixel electrode 191a and the first part 191c1 of the third subpixel electrode 191c have a shape in which four trapezoids are respectively combined to enclose a center part of the first and second pixel areas, the first part 191a1 of the first subpixel electrode 191a includes a first connection portion 96a that is disposed at a center part of the first pixel area Ra, and the first part 191c1 of the third subpixel electrode 191c includes a second connection portion 96b that has a cross shape and traverses a center part of the second pixel area Rb.

A second passivation layer 180b is disposed on the first part 191a1 of the first subpixel electrode 191a and the first part 191c1 of the third subpixel electrode 191c.

The second passivation layer 180b is formed with a fourth contact hole 186a that exposes the first connection portion 96a of the first part 191a1 of the first subpixel electrode 191a, and a fifth contact hole 186b that exposes the second connection portion 96b of the first part 191c1 of the third subpixel electrode 191c.

A second part 191a2 of the first subpixel electrode 191a, a first part 191b1 of the second subpixel electrode 191b, a second part 191c2 of the third subpixel electrode 191c, and a second part 191b2 of the second subpixel electrode 191b are disposed on the second passivation layer 180b. The first thin film transistor Qa, the second thin film transistor Qb, the third thin film transistor Qc, and the fourth thin film transistor Qd are disposed between the first subpixel electrode 191a and the third subpixel electrode 191c, and the first thin film transistor, the second thin film transistor, the third thin film transistor, and the fourth thin film transistor are disposed between the a first part 191b1 of the second subpixel electrode 191b and second part 191b2 of the second subpixel electrode 191b.

The second part 191a2 of the first subpixel electrode 191a and the first part 191b1 of the second subpixel electrode 191b are disposed in the first pixel area Ra, and the second part 191c2 of the third subpixel electrode 191c and the second part 191b2 of the second subpixel electrode 191b are disposed in the second pixel area Rb.

The second part 191a2 of the first subpixel electrode 191a is disposed in a center portion of the first pixel area Ra that the first part 191a1 of the first subpixel electrode 191a encloses, and is connected to the first part 191a1 of the first subpixel electrode 191a through the fourth contact hole 186a.

The first part 191b1 of the second subpixel electrode 191b is formed at a position to enclose the second part 191a2 of the first subpixel electrode 191a.

The second part 191a2 of the first subpixel electrode 191a and the first part 191b1 of the second subpixel electrode 191b are spaced apart from each other, and similar to the basic electrode 199 illustrated in FIG. 5, include a plurality of minute branch portions that respectively extend in different directions.

The second part 191c2 of the third subpixel electrode 191c is disposed in a center portion of the second pixel area Rb that the first part 191c1 of the third subpixel electrode 191c encloses, and is connected to the first part 191c1 of the third subpixel electrode 191c through the fifth contact hole 186b.

The second part 191b2 of the second subpixel electrode 191b is formed at a position to enclose the second part 191c2 of the third subpixel electrode 191c.

The second part 191c2 of the third subpixel electrode 191c and the second part 191b2 of the second subpixel electrode 191b are spaced apart from each other, and similar to the basic electrode 199 illustrated in FIG. 5, include a plurality of minute branch portions that respectively extend in different directions.

The first part 191a1 of the first subpixel electrode 191a includes a third extended portion 196a, the first and second passivation layers 180a and 180b are formed with the third extended portion 196a of the first part 191a1 of the first subpixel electrode 191a and a seventh contact hole 187a that exposes a wide end portion of the first drain electrode 175a, and the first connector 93a is disposed on the seventh contact hole 187a.

The first part 191a1 of the first subpixel electrode 191a is connected to the first drain electrode 175a through the first connector 93a such that it is applied with the first data voltage transmitted through the first data line 171a.

The first part 191c1 of the third subpixel electrode 191c includes a fourth extended portion 196b, the first and second passivation layers 180a and 180b are formed with the fourth extended portion 196b of the first part 191c1 of the third subpixel electrode 191c and an eighth contact hole 187b exposing a wide connection portion that connects the third drain electrode 175c to the fourth drain electrode 175d, and the second connector 93b is disposed on the eighth contact hole 187a.

The first part 191c1 of the third subpixel electrode 191c is connected to the third and fourth drain electrodes 175c and 175d through the second connector 93b.

The first and second passivation layers 180a and 180b are formed with a ninth contact hole 187c that exposes an extended portion of the second drain electrode 175b.

The first and second parts 191b1 and 191b2 of the second subpixel electrode 191b are connected to the second drain electrode 175b through the ninth contact hole 187c such that it is applied with the second data voltage from the second drain electrode 175b.

The first and second data voltages are obtained from one image signal, and respectively have different values.

The first data voltage may be greater than the second data voltage.

The first part 191c1 of the third subpixel electrode 191c is applied with a third data voltage between the first and second data voltages from the third and fourth drain electrodes 175c and 175d.

The second part 191a2 of the first subpixel electrode 191a is connected to the first connection portion 96a of the first part 191a1 of the first subpixel electrode 191a through the fourth contact hole 186a such that it is applied with the first data voltage.

Similarly, the second part 191c2 of the third subpixel electrode 191c is connected to the second connection portion 96b of the first part 191c1 of the third subpixel electrode 191c through the fourth contact hole 186b such that it is applied with the third data voltage.

If a first channel width CWA and a first channel length CLA of the third thin film transistor Qc connected to the first data line 171a are equal to a second channel width CWB and a second channel length CLB of the fourth thin film transistor Qd connected to the second data line 171b, the third subpixel electrode 191c is applied with the third data voltage that has an intermediate value between the first data voltage transmitted through the first data line 171a and the second data voltage transmitted through the second data line 17 lb.

However, if a first ratio (CWA/CLA) of the first channel width CWA of the third thin film transistor Qc to the first channel length CLA thereof is greater than a ratio (CWB/CLB) of the second channel width CWB of the fourth thin film transistor Qd to the second channel length CLB thereof, influence of the first data voltage transmitted through the third thin film transistor Qc is increased such that the third subpixel electrode 191c is applied with the third data voltage that has the intermediate value between the first data voltage transmitted through the first data line 171a and the second data voltage transmitted through the second data line 171b but is closer to the first data voltage than the second data voltage.

On the contrary, if the ratio (CWA/CLA) of the first channel width CWA of the third thin film transistor Qc to the first channel length CLA thereof is smaller than the ratio (CWB/CLB) of the second channel width CWB of the fourth thin film transistor Qd to the second channel length CLB thereof, influence of the second data voltage is increased such that the third subpixel electrode 191c is applied with the third data voltage that has the intermediate value between the first data voltage transmitted through the first data line 171a and the second data voltage transmitted through the second data line 171b but is closer to the second data voltage than the first data voltage.

Accordingly, the third data voltage applied to the third subpixel electrode 191c can be controlled by varying the ratios (CW/CL) of the channel widths CW to the channel lengths CL of the third and fourth thin film transistors Qc and Qd.

One pixel area includes the first pixel area Ra and the second pixel area Rb.

A size of the first pixel area Ra may be substantially equal to or larger than that of the second pixel area Rb.

The first part 191a1 of the first subpixel electrode 191a, the second part 191a2 of the first subpixel electrode 191a, and the first part 191b1 of the second subpixel electrode 191b are disposed in the first pixel area Ra.

The first pixel area Ra includes a first region R1 in which the second part 191a2 of the first subpixel electrode 191a to which the first data voltage is applied is disposed, a second region R2 in which the first part 191a1 of the first subpixel electrode 191a to which the first data voltage is applied partially overlaps the first part 191b1 of the second subpixel electrode 191b to which the second data voltage is applied, and a third region R3a in which a part of the first part 191b1 of the second subpixel electrode 191b to which the second data voltage is applied is disposed.

In the second region R2, together with an electric field formed between the first part 191b1 of the second subpixel electrode 191b to which the second data voltage is applied and the common electrode 270, an electric field formed between the first part 191a1 of the first subpixel electrode 191a disposed between the plurality of branch electrodes of the first part 191a1 of the first subpixel electrode 191a and the common electrode 270 is applied to the liquid crystal layer.

Thus, the electric field applied to the liquid crystal layer of the second region R2 is smaller than that applied to the liquid crystal layer of the first region R1, but is greater than that applied to the liquid crystal layer of the third region R3a.

The first part 191c1 of the third subpixel electrode 191c, the second part 191c2 of the third subpixel electrode 191c, and the second part 191b2 of the second subpixel electrode 191b are disposed in the second pixel area Rb.

The second pixel area Rb includes a fourth region R4 in which the second part 191c2 of the third subpixel electrode 191c to which the third data voltage is applied is disposed, a fifth region R5 in which the first part 191c1 of the third subpixel electrode 191c to which the third data voltage is applied partially overlaps the second part 191b2 of the second subpixel electrode 191b to which the second data voltage is applied, and a sixth region R3b in which a part of the second part 191b1 of the second subpixel electrode 191b to which the second data voltage is applied is disposed.

In the fifth region R5, together with an electric field formed between the first part 191c1 of the third subpixel electrode 191c to which the third data voltage is applied and the common electrode 270, an electric field formed between the first part 191c1 of the third subpixel electrode 191c disposed between a plurality of branch electrodes of the second part 191b2 of the second subpixel electrode 191b2 and the common electrode 270 is applied to the liquid crystal layer.

Thus, the electric field applied to the liquid crystal layer of the fifth region R5 is smaller than that applied to the liquid crystal layer of the fourth region R4, but is greater than that applied to the liquid crystal layer of the sixth region R3b.

In addition, the electric field applied to the third region R3a is equal to that applied to the sixth region R3b.

The liquid crystal display according to an embodiment divides one pixel area into the first region R1, the second region R2, the fourth region R4, the fifth region R5, the third region R3a, and the sixth region R3b to which the different electric fields are respectively applied.

As such, by dividing one pixel area into five regions to which the different electric fields are respectively applied, the electric fields are differently applied to the liquid crystal molecules corresponding to the five regions such that the liquid crystal molecules are differently inclined to form the regions of different luminance.

As such, if one pixel area is divided into the five regions of different luminance, the transmittance is prevented from being abruptly changed at the side even at the low grayscale or the high grayscale by smoothly controlling the transmittance according to grayscale, such that the side visibility can be similar to the front visibility and the accurate gray expression is possible even at the low grayscale and the high grayscale.

Another experimental example will now be described with reference to FIG. 11.

Figure 11:
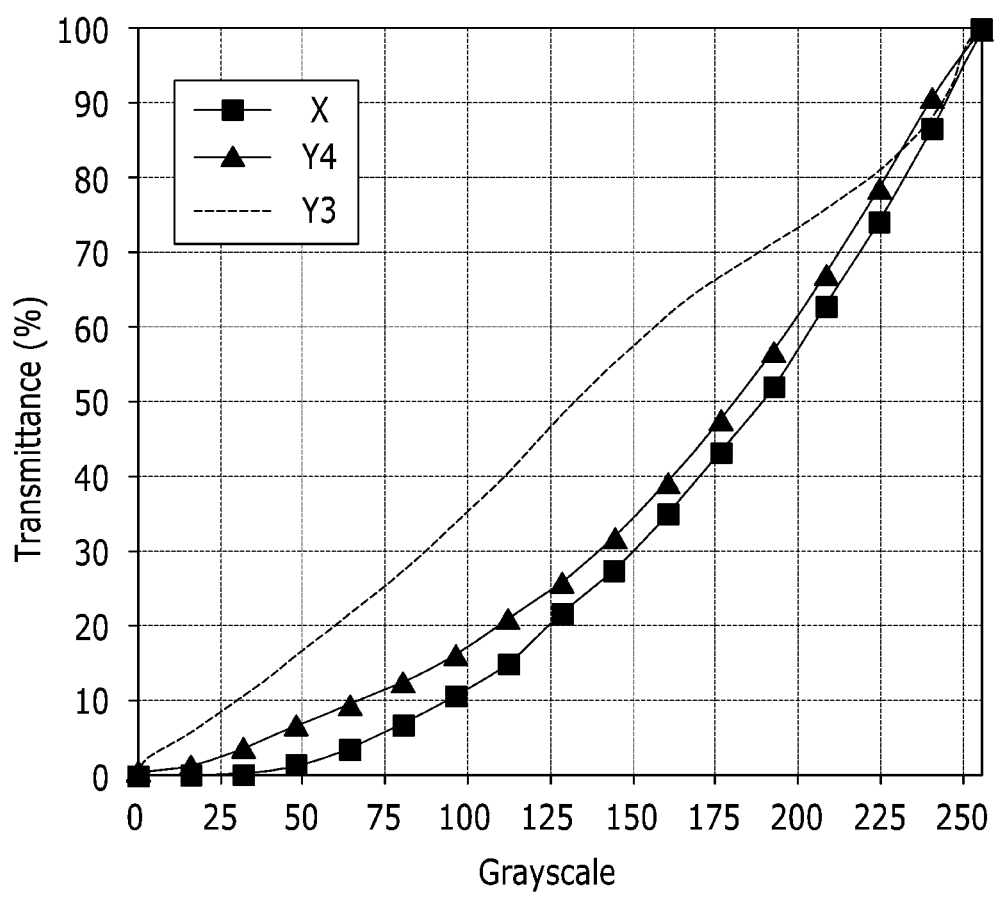
FIG. 11 is a graph showing transmittance of the liquid crystal display according to grayscale in another experimental example.

FIG. 11 is a graph showing transmittance of the liquid crystal display according to grayscale in another experimental example.

In the experimental example, the transmittance X of the liquid crystal display according to grayscale when viewed from a front side thereof and the transmittances Y3 and Y4 thereof according to grayscale when viewed from the lateral side thereof are compared with respect to a third case and a fourth case. The third case is a conventional liquid crystal display, in which one pixel area is divided into a region where the first subpixel electrode to which the relatively high first data voltage is applied is disposed, and a region where the second subpixel electrode to which the relatively low data voltage is applied is disposed. The fourth case is an embodiment in which one pixel area is divided into the five regions to which the electric fields are differently applied.

In FIG. 11, the transmittance of the third case according to grayscale when viewed from the lateral side thereof is represented as Y3, while the transmittance of the fourth case according to grayscale when viewed from the lateral side thereof is represented as Y4.

Referring to FIG. 11, when compared with the transmittance Y3 of the third case according to grayscale when viewed from the lateral side thereof, it can be seen that the transmittance Y4 of the fourth case according to grayscale when viewed from the lateral side thereof is closer to the transmittance X according to grayscale when viewed from the lateral side thereof.

While this invention has been described in connection with certain embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a gate line extending in a first direction and disposed on the first substrate;
   a first data line and a second data line extending in a second direction which cross the first direction and disposed on the first substrate; and
   a pixel connected to the gate line, the first data line and the second data line;
   wherein the pixel comprise a first thin film transistor connected to the gate line and to the first data line;
   a first subpixel electrode connected to the first thin film transistor;
   a second thin film transistor connected to the gate line and to the second data line;
   a second subpixel electrode connected to the second thin film transistor;
   a third thin film transistor connected to the gate line and to the first data line;
   a fourth thin film transistor connected to the gate line and to the second data line; and
   a third subpixel electrode connected to the third and fourth thin film transistors.

2. The display of claim 1, wherein
   the first thin film transistor and the second thin film transistor are disposed between the first subpixel electrode and the second subpixel electrode, and
   the third thin film transistor and the fourth thin film transistor are disposed between the second subpixel electrode and the third subpixel electrode.

3. The display of claim 1, wherein
   the third subpixel electrode is connected between drain electrodes of the third and fourth thin film transistors, and
   a ratio of a channel width of the third thin film transistor to a channel length thereof is substantially equal to or is different from the ratio of a channel width of the fourth thin film transistor to a channel length thereof.

4. The display of claim 3, wherein
   a first area H of the first subpixel electrode, a second area L of the second subpixel electrode, and a third area M of the third subpixel electrode satisfy the equation: $H \leq M < L$.

5. The display of claim 4, wherein
   the first data line transmits a first data voltage,
   the second data line transmits a second data voltage,
   the first and second data voltages are obtained from one image signal and are different from each other, and
   the third subpixel electrode is applied with a third voltage between the first data voltage and the second data voltage.

6. The display of claim 5, wherein
   the gate line includes a first gate line and a second gate line connected to each other,
   the first and second thin film transistors are connected to the first gate line, and
   the third and fourth thin film transistors are connected to the second gate line.

7. The display of claim 1, wherein
   a first area H of the first subpixel electrode, a second area L of the second subpixel electrode, and a third area M of the third subpixel electrode satisfy the equation $H \leq M < L$.

8. The display of claim 7, wherein
   the first data line transmits a first data voltage,
   the second data line transmits a second data voltage,
   the first and second data voltages are obtained from one image signal and are different from each other, and
   the third subpixel electrode is applied with a third voltage between the first data voltage and the second data voltage.

9. The display of claim 8, wherein
   the gate line includes a first gate line and a second gate line that are connected to each other,
   the first and second thin film transistors are connected to the first gate line, and
   the third and fourth thin film transistors are connected to the second gate line.

10. The display of claim 1, wherein
    the gate line includes a first gate line and a second gate line that are connected to each other,
    the first and second thin film transistors are connected to the first gate line, and
    the third and fourth thin film transistors are connected to the second gate line.

11. The display of claim 1, further comprising
    an insulating layer disposed on the gate line, the first data line, and the second data line, and
    wherein a first portion of the first subpixel electrode overlaps a first portion of the second subpixel electrode while interposing the insulating layer therebetween,d
    a first portion of the third subpixel electrode overlaps a second portion of the second subpixel electrode while interposing the insulating layer therebetween.

12. The display of claim 11, wherein
    the first thin film transistor, the second thin film transistor, the third thin film transistor, and the fourth thin film transistor are disposed between the first subpixel electrode and the third subpixel electrode, and
    the first thin film transistor, the second thin film transistor, the third thin film transistor, and the fourth thin film transistor are disposed between the first portion of the second subpixel electrode and the second portion of the second subpixel electrode.

13. The display of claim 12, wherein
    the first portion of the first subpixel electrode is disposed under the insulating layer,
    the second portion of the first subpixel electrode is disposed on the insulating layer, and
    the first portion and the second portion of the first subpixel electrode are connected to each other through a contact hole that is formed in the insulating layer.

14. The display of claim 13, wherein
    the first portion of the third subpixel electrode is disposed under the insulating layer,
    the second portion of the third subpixel electrode is disposed on the insulating layer, and
    the first portion and the second portion of the third subpixel are connected to each other through a contact hole that is formed in the insulating layer.

15. The display of claim 14, wherein
the first portion of the first subpixel electrode, the second portion of the first subpixel electrode, and the first portion of the second subpixel electrode are disposed in a first pixel area,
the first portion of the third subpixel electrode, the second portion of the third subpixel electrode, and the second portion of the second subpixel electrode are disposed in a second pixel area, and
a size of the first pixel area is substantially equal to or greater than a size of the second pixel area.

16. The display of claim 14, wherein
the third subpixel electrode is connected to drain electrodes of the third and fourth thin film transistors, and
a ratio of a channel width of the third thin film transistor to a channel length thereof is substantially equal to or different from a ratio of a channel width of the fourth thin film transistor to a channel length thereof.

17. The display of claim 14, wherein
the first portion of the second subpixel electrode is disposed on the insulating layer and has a plurality of minute branch portions, and
the first portion of the first subpixel electrode is disposed under the insulating layer and has a planar shape.

18. The display of claim 17, wherein
the second portion of the second subpixel electrode is disposed on the insulating layer and has a plurality of minute branch portions, and
the first portion of the third subpixel electrode is disposed under the insulating layer and has a planar shape.

19. The display of claim 18, wherein
the first portion of the first subpixel electrode, the second portion of the first subpixel electrode, and the first portion of the second subpixel electrode are disposed in a first pixel area,
the first portion of the third subpixel electrode, the second portion of the third subpixel electrode, and the second portion of the second subpixel electrode are disposed in a second pixel area, and
a size of the first pixel area is substantially equal to or greater than a size of the second pixel area.

20. The display of claim 19, wherein
the third subpixel electrode is connected to drain electrodes of the third and fourth thin film transistors, and
a ratio of a channel width of the third thin film transistor to a channel length thereof is substantially equal to or different from a ratio of a channel width of the fourth thin film transistor to a channel length thereof.

21. The display of claim 11, wherein
the first portion of the second subpixel electrode is disposed on the insulating layer and has a plurality of minute branch portions, and
the first portion of the first subpixel electrode is disposed under the insulating layer and has a planar shape.

22. The display of claim 21, wherein
the second portion of the second subpixel electrode is disposed on the insulating layer and has a plurality of minute branch portions, and
the first portion of the third subpixel electrode is disposed under the insulating layer and has a planar shape.

23. The display of claim 22, wherein
the third subpixel electrode is connected to drain electrodes of the third and fourth thin film transistors, and
a ratio of a channel width of the third thin film transistor to a channel length thereof is substantially equal to or different from a ratio of a channel width of the fourth thin film transistor to a channel length thereof.

* * * * *